US008961625B2

(12) United States Patent
Hartvigsen et al.

(10) Patent No.: US 8,961,625 B2
(45) Date of Patent: Feb. 24, 2015

(54) CATALYTIC MICROCHANNEL REFORMER

(75) Inventors: Joseph J. Hartvigsen, Kaysville, UT (US); Balakrishnan G. Nair, Sandy, UT (US); Merrill Wilson, West Jordan, UT (US); Akash Akash, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 1719 days.

(21) Appl. No.: 11/960,515

(22) Filed: Dec. 19, 2007

(65) Prior Publication Data

US 2008/0148636 A1 Jun. 26, 2008

Related U.S. Application Data

(60) Provisional application No. 60/871,398, filed on Dec. 21, 2006.

(51) Int. Cl.
*B01D 71/02* (2006.01)
*C01B 3/00* (2006.01)
(Continued)

(52) U.S. Cl.
CPC ......... *B01J 19/0093* (2013.01); *B01D 67/0044* (2013.01); *B01D 71/024* (2013.01); *C01B 3/323* (2013.01); *C01B 3/384* (2013.01); *C01B 3/48* (2013.01); *C01B 3/503* (2013.01); *B01J 2219/00783* (2013.01); *B01J 2219/00835* (2013.01); *B01J 2219/00873* (2013.01); *B01J 2219/00907* (2013.01); *C01B 2203/0233* (2013.01); *C01B 2203/0283* (2013.01);
(Continued)

(58) Field of Classification Search
USPC .............................................. 48/197 R; 95/55
See application file for complete search history.

(56) References Cited

U.S. PATENT DOCUMENTS 2,441,297 A     5/1948   Stirton
4,846,906 A  *  7/1989   Helferich et al. .......... 156/89.28
(Continued)

FOREIGN PATENT DOCUMENTS

JP        05317708      12/1993
JP        06345408      12/1994
(Continued)

OTHER PUBLICATIONS

Angell, J. B., et al., "Silicon Micromechanical Devices", *Scientific American*, 248, (1983), 1, 44-55.
Declerck, "Silicon Oxidation", *Microelectronic Materials and Processes*, (1989), 79-132.
Liew, et al., "Fabrication of SiCN ceramic MEMS using injectable polymer-precursor technique", *Sensors and Actuators A*, 89, (2001), 64-70.
(Continued)

*Primary Examiner* — Matthew Merkling
(74) *Attorney, Agent, or Firm* — David Fonda

(57) ABSTRACT

An apparatus and method for enhancing the yield and purity of hydrogen when reforming hydrocarbons is disclosed in one embodiment of the invention as including receiving a hydrocarbon feedstock fuel (e.g., methane, vaporized methanol, natural gas, vaporized diesel, etc.) and steam at a reaction zone and reacting the hydrocarbon feedstock fuel and steam in the presence of a catalyst to produce hydrogen gas. The hydrogen gas is selectively removed from the reaction zone while the reaction is occurring by selectively diffusing the hydrogen gas through a porous ceramic membrane. The selective removal of hydrogen changes the equilibrium of the reaction and increases the amount of hydrogen that is extracted from the hydrocarbon feedstock fuel.

21 Claims, 5 Drawing Sheets

(51) Int. Cl.
  *C01B 3/50*    (2006.01)
  *B01J 19/00*   (2006.01)
  *B01D 67/00*   (2006.01)
  *C01B 3/32*    (2006.01)
  *C01B 3/38*    (2006.01)
  *C01B 3/48*    (2006.01)

(52) U.S. Cl.
  CPC ..... *C01B2203/041* (2013.01); *C01B 2203/047* (2013.01); *C01B 2203/0475* (2013.01); *C01B 2203/048* (2013.01); *C01B 2203/0495* (2013.01); *C01B 2203/0811* (2013.01); *C01B 2203/0822* (2013.01); *C01B 2203/0827* (2013.01); *C01B 2203/1058* (2013.01); *C01B 2203/1223* (2013.01); *C01B 2203/1241* (2013.01); *C01B 2203/1247* (2013.01); *C01B 2203/141* (2013.01); *C01B 2203/145* (2013.01); *C01B 2203/82* (2013.01); *B01D 2325/22* (2013.01); *B01D 2325/30* (2013.01)
  USPC ............... 48/61; 48/197 R; 423/644; 423/650

(56) References Cited

U.S. PATENT DOCUMENTS

| | | | |
|---|---|---|---|
| 5,538,706 | A | 7/1996 | Kapoor |
| 5,938,800 | A * | 8/1999 | Verrill et al. ............... 48/127.9 |
| 6,207,132 | B1 * | 3/2001 | Lin et al. .................... 423/648.1 |
| 6,409,940 | B1 | 6/2002 | Gaffney et al. |
| 6,569,226 | B1 | 5/2003 | Dorris et al. |
| 6,830,596 | B1 * | 12/2004 | Deckman et al. ................ 48/95 |
| 7,527,661 | B2 * | 5/2009 | Chellappa et al. .......... 48/197 R |
| 2003/0031613 | A1 | 2/2003 | Tonkovich et al. |
| 2003/0183080 | A1 * | 10/2003 | Mundschau ...................... 95/55 |
| 2004/0028913 | A1 * | 2/2004 | Hennige et al. ............... 428/446 |
| 2004/0043204 | A1 | 3/2004 | Nair et al. |
| 2006/0013759 | A1 | 1/2006 | Jiang et al. |
| 2006/0233700 | A1 | 10/2006 | Chellappa et al. |

FOREIGN PATENT DOCUMENTS

| | | |
|---|---|---|
| JP | 07017701 | 1/1995 |
| JP | 08040703 | 2/1996 |
| JP | 2000510526 | 8/2000 |
| JP | 2003522087 | 7/2003 |
| JP | 2004531440 | 10/2004 |
| JP | 2005537212 | 12/2005 |
| WO | WO-01/28678 | 4/2001 |
| WO | WO-02070402 | 9/2002 |
| WO | WO-2006/017022 | 2/2006 |

OTHER PUBLICATIONS

Lin, et al., "Comparative study of hot embossed micro structures fabricated by laboratory and commercial environments", *Microsystem Technologies*, 4, (1998), 113-116.

Nam, et al., "m-Mold Shape Deposition Manufacturing of Ceramic Parts", *MRS Symposium Proceedings*, vol. 625, pp. 187-192, San Francisco, Apr. 2000, 1-6. Available Online at info.tuwien.ac.at/stampfl/publikationen/nam_2000.pdf.

Young, International Search Report for PCT/US07/26101 sent Apr. 16, 2008, 1-2.

Young, Written Opinion for PCT/US07/26101 sent Apr. 16, 2008, 1-5.

Akash, et al., U.S. Appl. No. 11/781,125, filed Jul. 20, 2007, 1-33.

Akash, et al., U.S. Appl. No. 11/464,476, filed Aug. 14, 2006, 1-41.

Fernando, et al., "Thermomechanical Properties of Alumina Fiber Membrane", *Ceramics International 31*, Elsevier Ltd and Techna Group S.r.l, (Sep. 1, 2004),453-460.

Harf-Bapin, E "Supplementary European Search Report", EP Application No. EP07867906 (Corresponding to U.S. Appl. No. 11/960,515) (Jan. 6, 2012),1-9.

Edlund, et al., "Bibliographical Data and Abstract (English Language) Corresponding to JP2003-522087", JP2003-522087, (Jul. 22, 2003),1-2.

Edlund, et al., "Bibliographical Information and Abstract (English Language) Corresponding to JP2000-510526", JP2000-510526, (Aug. 15, 2000),1-2.

Sakai, et al., "Bibliographical Data and Abstract (English Language)", JP08040703, (Feb. 13, 1996),1-2.

"Notice of Reasons for Rejection", JP2009-542928 (Corresponding to U.S. Appl. No. 11/960,515), (Aug. 21, 2012),1-4.

"English Translation of Notice of Reasons for Rejections", JP2009-542928 (Corresponding to U.S. Appl. No. 11/960,515, (Aug. 21, 2012),1-7.

Eguchi, et al., "Bibliographical Data and Abstract (English Language)", JP07-017701, (Jan. 20, 1995),1-2.

Shirasaki, et al., "Bibliographical Data and Abstract (English Language)", JP06-345408, (Dec. 20, 2012),1-2.

Imai, et al., "Bibliographical Data and Abstract (English Language)", JP 05-317708, (Dec. 3, 1993),1-2.

Matzakos, et al., "Bibliographical Data and Abstract (English Language) Corresponding to JP2004-531440", JP 2004-531440, (Oct. 14, 2004),1-2.

Nair, et al., "Bibliographical Data and Abstract (English Language) Corresponding to JP2005-537212", JP2005-537212, (Dec. 8, 2005),1.

* cited by examiner

CATALYTIC MICROCHANNEL REFORMER

RELATED APPLICATIONS

This application claims priority to, and the benefit of, U.S. Provisional Patent No. 60/871,398 filed on Dec. 21, 2006 and entitled CATALYTIC MICROCHANNEL REFORMER, which application is incorporated by reference.

U.S. GOVERNMENT INTEREST

This invention was made with Government support under grant number DMI-0321692, awarded by the National Science Foundation. The Government has certain rights in this invention.

BACKGROUND OF THE INVENTION

1. Field of the Invention

This invention relates to microreactors and more particularly to microreactors for reforming hydrocarbon fuels and generating hydrogen gas.

2. Description of the Related Art

A microreactor (or microstructured reactor or microchannel reactor) is a device in which chemical reactions are designed to take place in confined spaces having lateral dimensions of less than 1 mm. Currently, there are major technological issues that prevent current technology from meeting the needs of microreactors for generating hydrogen, syngas, or performing specialty chemical synthesis. In general, gas-phase reactions for generating hydrogen and other specialty chemicals require microfabricated components that can perform under harsh operating conditions such as high temperatures, high temperature transients, or corrosive or erosive environments.

Current microfabrication processes (e.g., wet etching, dry etching, lithography, LIGA, etc.) are primarily applicable to silicon, photoresists, and metals. These materials readily corrode when subjected to hot gas streams that contain corrosive ingredients such as oxygen, steam, $CO_2$, sulphur, and trace metals, each of which may be present when generating $H_2$ from natural gas or using gas-phase specialty chemical synthesis. Another important factor when generating hydrogen gas for fuel cells is the $H_2$ to CO ratio, since a higher ratio reduces the cost of CO removal.

The few processes that are available for microfabricating ceramics are either prohibitively expensive due to the need for very expensive precursor materials, such as pre-ceramic polymers, or are unable to attain the high precision required as a result of shrinkage that occurs during sintering. The shrinkage problem in particular often creates a need for very expensive secondary machining operations. Furthermore, many high temperature gas-phase reactions require passing gas streams over catalysts. The introduction of catalysts into silicon, metal, or sintered-ceramic-based microreactors is typically a complex multi-step process that requires a high surface area (i.e., highly porous) wash-coat to be applied inside the channels of the microreactor prior to catalyst deposition. This wash-coat is necessitated by the very low component surface area of silicon and metals. The wash-coat is typically easily damaged during operation because it poorly bonds with silicon, metal or sintered ceramic. This characteristic undesirably shortens the life of the microreactor.

In view of the foregoing, what are needed are robust ceramic materials for fabricating microreactors that are able to withstand high temperatures, high temperature transients, or corrosive or erosive environments and thus have excellent thermal shock resistance and thermal cycling properties. Ideally, such materials would enable features to be fabricated in net-shape and net-size with very high precision. Further needed are microreactors that increase the $H_2$ to CO ratio to reduce the cost of CO removal by secondary operations such as membrane reactors. Further needed are microreactors to increase the amount of hydrogen that can be extracted from hydrocarbon feedstock fuels. Further needed are ceramic materials that enable cost-effective fabrication of microreactors. Yet further needed are porous ceramic materials with intrinsically high surface area that can be infiltrated with catalysts to increase hydrocarbon reformation efficiency.

SUMMARY OF THE INVENTION

Consistent with the foregoing and in accordance with the invention as embodied and broadly described herein, a method for enhancing the yield and purity of hydrogen when reforming hydrocarbons is disclosed in one embodiment of the invention as including receiving a hydrocarbon feedstock fuel (e.g., methane, vaporized methanol, natural gas, vaporized diesel, etc.) and steam at a reaction zone and reacting the hydrocarbon feedstock fuel and steam in the presence of a catalyst to produce hydrogen gas. The hydrogen gas is selectively removed from the reaction zone while the reaction is in process by selectively diffusing the hydrogen gas through a porous ceramic membrane. The selective removal of hydrogen changes the equilibrium of the reaction and increases the amount of hydrogen that can be extracted from the hydrocarbon feedstock fuel.

In selected embodiments, the porous ceramic membrane is fabricated from a mixture of alumina powder and a phosphate-containing reagent to react with the alumina powder. For example, HSA-CERCANAM® provides one such material. This material is able to withstand high temperatures, high temperature transients, and corrosive and erosive environments. Thus, this material has excellent thermal shock resistance and thermal cycling properties. In selected embodiments, the method further includes providing heat to the reaction zone to react the hydrocarbon feedstock fuel and steam. This heat may be generated by combusting one or more residual reactants or reaction products such as hydrocarbons, hydrogen gas, and carbon monoxide that are left over or are byproducts of the hydrocarbon/steam reaction.

In another aspect of the invention, a device for enhancing the yield and purity of hydrogen when reforming hydrocarbons may include an inlet for receiving a hydrocarbon feedstock fuel and steam. A reaction zone may be placed in communication with the inlet to react the hydrocarbon feedstock fuel and steam in the presence of a catalyst to produce hydrogen gas. A porous ceramic membrane is provided to selectively remove hydrogen gas from the reaction zone while the reaction in occurring, thereby increasing the extent of reaction between the hydrocarbon feedstock fuel and the steam and increasing the yield of hydrogen.

In yet another aspect of the invention, a ceramic microchannel device for reforming a hydrocarbon fuel to produce hydrogen gas is disclosed. This ceramic microchannel device is fabricated at least in part from a ceramic made be mixing alumina powder with a phosphate-containing reagent to react with the alumina powder.

In yet another aspect of the invention, a method for enhancing the yield and purity of hydrogen when reforming hydrocarbons includes receiving a hydrocarbon feedstock fuel and steam at a reaction zone. The hydrocarbon feedstock fuel and steam are then reacted at the reaction zone to produce hydrogen gas. The hydrogen gas is then selectively removed from the reaction zone while the reaction is occurring by extracting hydrogen gas or hydrogen ions from the reaction zone. In selected embodiments, the hydrogen gas is removed from the reaction zone by diffusing the hydrogen gas through a porous ceramic membrane. In other embodiments, hydrogen gas is removed from the reaction zone by conducting hydrogen ions through an ionically-conductive ceramic membrane.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
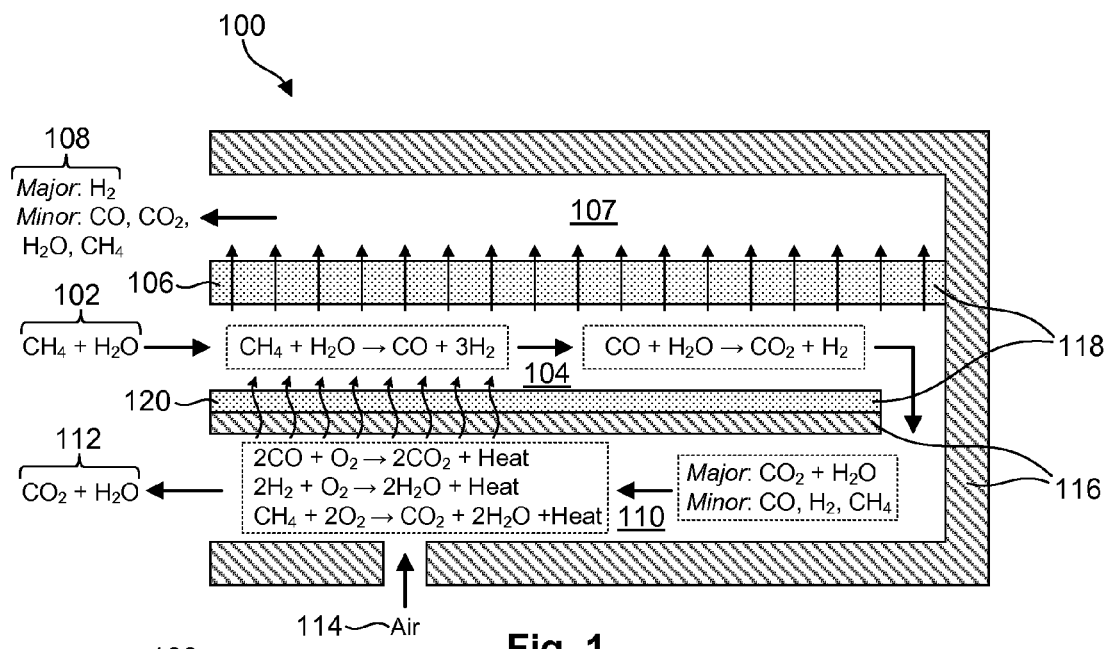
FIG. 1 is a high-level schematic diagram of one embodiment of a catalytic microchannel reformer in accordance with the invention.

Referring to FIG. 1, in selected embodiments, a catalytic microchannel reformer 100 in accordance with the invention may be adapted to receive an input 102, comprising a hydrocarbon feedstock fuel and steam, at a reaction zone 104. For the purposes of this description, a hydrocarbon includes any molecule containing both hydrogen and carbon. In selected embodiments, the reaction zone 104 may exist within one or more microchannels of the device 100, as will be explained in more detail hereafter. In selected embodiments, an input 102 comprising methane ($CH_4$) (the primary constituent in natural gas) and steam ($H_2O$) may be used as the inputs to the reaction zone 104. For the purposes of this disclosure, methane will be used as the hydrocarbon feedstock fuel. In other embodiments, however, other hydrocarbon feedstock fuels such as propane, methanol, diesel, or the like, may be used in place of methane. Where the feedstock fuel is a liquid, some pre-heating may be performed to vaporize the liquids prior to input to the reformer 100.

At the reaction zone 104, the reactants 102 may be heated to approximately 650° C. to 700° C. in the presence of a catalyst, such as a nickel-based catalyst or other catalyst known in the art. The catalyst will cause the steam and methane to react to form carbon monoxide and hydrogen in accordance with the following reaction:

$$CH_4 + H_2O \rightarrow CO + 3H_2$$

This reaction is commonly referred to as steam methane reforming (SMR), which is one of the most common and least expensive methods for producing bulk hydrogen. In selected embodiments, the reactant stream 102 may be pre-heated prior to being input to the device 100 to aid the reformation process and reduce the time and amount of heat that is required to bring the reactants 102 to the necessary temperature.

In selected embodiments, additional hydrogen may be recovered at the reaction zone 104 using a lower temperature (550° C. to 600° C.) gas-shift reaction. This reaction may react the carbon monoxide (CO) generated above with steam to produce hydrogen gas and carbon dioxide in accordance with the following equation:

$$CO + H_2O \rightarrow CO_2 + H_2$$

This reaction is commonly referred to as a water-gas-shift (WGS) reaction. Both of the above reactions require steam as one of the reactants. In selected embodiments, a high steam-to-methane ratio (e.g., 2:1) may be provided in the input stream 102 to ensure that coking is minimized during the SMR and WGS reactions.

In selected embodiments, the microchannel reformer 100 may be designed such that the SMR and WGS reactions take place isothermally. Because the microchannel reformer 100 may be very small (with dimensions on the order of several inches), the small size may impose substantially isothermal conditions. In general, a higher temperature (generally above 600° C.) favors the forward reaction in the case of SMR and the reverse reaction in the case of WGS. This is one reason why these two reactions are generally not combined in a single reactor. However, in selected embodiments, a microchannel reformer 100 in accordance with the invention may combine both of these reactions in a single device 100. Both of these reactions may be driven to near completion by continuously removing hydrogen gas from the reaction zone 104. This may be accomplished using a porous ceramic membrane 106 (with micro- or nano-sized pores) located adjacent to the reaction zone 104. As the SMR and WGS reactions proceed in a forward direction, hydrogen gas may selectively diffuse through the membrane 106, creating a deficit of product (hydrogen) in the reaction zone 104. This deficit may drive the SMR and WGS reactions nearer to completion. In alternative embodiments, an ionically-conductive membrane 106 may be used to selectively remove hydrogen gas from the reaction zone 104 by transporting hydrogen ions through the membrane 106.

For the purpose of this description, "selectively" removing hydrogen from the reaction zone 104 may also include removing other gaseous species from the reaction zone 104 by diffusion through the membrane 106, although this may occur at a significantly lower diffusion rate. Thus, the term "selectively," as used herein, does not necessarily mean exclusively removing hydrogen, but rather that the membrane 106 may remove hydrogen gas from the reaction zone 104 at a faster rate than it removes other gaseous species. The higher diffusion rate of hydrogen is primarily due to hydrogen's lower molecular weight compared to other gaseous species in the reformer 100. The diffusion rate is proportional to the square root of the molecular weight of each gas. By removing hydrogen from the reaction zone 104 faster than other gaseous species, the equilibrium of the SMR and WGS reactions may be shifted, driving the reactions nearer to completion.

As shown in FIG. 1, a product stream 108 may contain primarily $H_2$, but may also include secondary gaseous species such as CO, $CO_2$, $H_2O$, and $CH_4$. Reactants and reaction products that do not diffuse through the membrane 106, which may include primarily $CO_2$ and $H_2O$, but may also include residual CO, $H_2$, and $CH_4$, may be conveyed to a combustion zone 110. Here, the reactants and reaction products may be combusted in the presence of air 114 to generate heat and fully oxidize the remaining reactants in accordance with the following equations:

$$2CO+O_2 \rightarrow 2CO_2+Heat$$

$$2H_2+O_2 \rightarrow 2H_2O+Heat$$

$$CH_4+2O_2 \rightarrow CO_2+2H_2O+Heat$$

After combustion, an exhaust stream 112 containing primarily $CO_2$ and $H_2O$ may be output from the microchannel reformer 100. Ideally, the microchannel reformer 100 will be designed such that the amount of combustible gases conveyed to the combustion zone 110 will produce enough heat to drive the SMR reactions in the reaction zone 104, while still maximizing the amount of hydrogen in the product stream 108. Table I below shows various calculations with respect to the gas compositions at various locations in the microchannel reformer 100. The calculations in Table I assume that the extents of reaction for both the SMR and WGS reactions stay constant through the reaction zone 104. More specifically, Table I shows approximate gas compositions inside the reaction zone 104 and the product zone 107 assuming that the extent of reaction for both the SMR and WGS reactions is 0.9 and the initial steam-to-methane ratio is 2:1.

As indicated in Table I, the diffusion rate of hydrogen is almost three times greater than the next closest gas. Furthermore, Table I shows that the gas composition in the reaction zone 104 may include about 73.1 percent $H_2$ after the SMR and WGS reactions have progressed to near completion. The $H_2$ concentration in the product stream 108 may increase to about 91.4 percent after the hydrogen and other gases diffuse through the membrane 106. This concentration may increase to about 93.8 percent after water is removed (e.g., condensed) from the product stream 108. The hydrogen concentration may be increased even further if the $CO_2$ is removed from the product stream through a process such as compression and liquefaction.

TABLE I

Expected Gas Compositions

| Gas | Molecular Weight | Reaction zone Gas Composition (%) | Diffusion Rate Relative to $H_2$ | Product Stream Composition - Wet Basis (%) | Product Stream Composition - Dry Basis (%) |
| --- | --- | --- | --- | --- | --- |
| $H_2$ | 2 | 73.1 | 1.000 | 91.4 | 93.8 |
| $CH_4$ | 16 | 2.1 | 0.354 | 0.9 | 0.9 |
| $H_2O$ | 18 | 6.0 | 0.333 | 2.5 | 0.0 |
| CO | 28 | 1.9 | 0.267 | 0.6 | 0.6 |
| $CO_2$ | 44 | 16.9 | 0.213 | 4.5 | 4.6 |

As mentioned previously, gas-phase reactions for generating hydrogen or syngas typically require microfabricated components that can perform under harsh operating conditions such as high temperatures, high temperature transients, or corrosive or erosive environments. Such materials should have excellent thermal shock resistance and thermal cycling properties. Further needed are materials that enable features to be fabricated in net-shape and net-size with very high precision.

In selected embodiments in accordance with the invention, ceramic materials marketed under the tradename CERCANAM® may be used to fabricate all or part of the catalytic microchannel reformer 100. These ceramic materials may be classified as either HAS-CERCANAM®, which has a very high surface area and a continuous nanopore network, or regular CERCANAM® or LSA-CERCANAM®, which is substantially the same material but is designed to have a lower surface area and thus a reduced pore structure. In general, these ceramic materials may be classified as phosphate-bonded ceramic materials. That is, each of these CERCANAM® compositions may be fabricated from ceramic powders (e.g., alumina powder) combined with phosphate-containing reagents (e.g., phosphoric acid). The phosphate-containing reagents may react with the ceramic powders to bond the ceramic powders together.

In selected embodiments, the pore-structure of the HSA-CERCANAM® may be created or enhanced simply by adding a pore former to the LSA-CERCANAM® slip. CERCANAM® and similar materials are disclosed, for example, in U.S. patent application Ser. No. 11/464,476 filed on Aug. 14, 2006 and entitled PROCESS FOR MAKING CERAMIC INSULATION and U.S. patent application Ser. No. 11/781,125 filed on Jul. 20, 2007 and entitled METHOD FOR JOINING CERAMIC COMPONENTS, both of which are incorporated by this reference.

The CERCANAM® material described herein is particularly suitable for fabricating a catalytic microchannel reformer 100 in accordance with the invention. For example, both HSA-CERCANAM® and LSA-CERCANAM® exhibit thermal stability in oxidizing and reducing environments up to 1000° C. for at least 16 hours. Thus, this material may be used to fabricate a microchannel reformer 100 with long life and minimal component degradation. Furthermore, both HSA-CERCANAM® and LSA-CERCANAM® exhibit excellent thermal shock resistance when rapidly cycled between room temperature and 800° C. This facilitates rapid heating or cooling of the microchannel reformer 100 during startup or shutdown. In selected embodiments, fuel in the microchannel reformer 100 may be spark-ignited for rapid heat-up to 700° C.

Another benefit of both HSA-CERCANAM® and LSA-CERCANAM® is that these ceramic materials may be microfabricated in net-shape and net-size with very high precision. In selected embodiments, these materials may be cast in various shapes and forms to fabricate monolithic components. The unique characteristics of CERCANAM® allow it to be cast on and around features, either sacrificial or permanent. Using sacrificial features, for example, microchannels may be incorporated internally into a monolithic CERCANAM® piece in a simple one-step process. Where structures include both HSA-CERCANAM® and LSA-CERCANAM®, the structure may be fabricated in two casts, one each for HSA-CERCANAM® and LSA-CERCANAM®. The ability to fabricate CERCANAM® components using minimal fabrication steps significantly lowers component costs.

In selected embodiments in accordance with the invention, a microchannel reformer 100 may be fabricated from both HSA-CERCANAM® and LSA-CERCANAM® compositions. For example, the cross-hatched portions 116 of the reformer 100 may be fabricated from LSA-CERCANAM® while the cross-hatched portions 118 may be fabricated from HSA-CERCANAM®. Thus, in selected embodiments, the membrane 106 may be fabricated from HSA-CERCANAM® because it provides a material with high surface area and a network of sub-micron and non-sized pores. The pore size and structure may be tailored, as needed, to provide a membrane 106 with desired characteristics. HSA-CERCANAM® has been found to provide an effective membrane 106 to selectively remove hydrogen from the reaction zone 104 and thereby drive the SMR and WGS reactions nearer to completion.

In selected embodiments, a wall 120 or surface 120 of the reaction zone 104 may also be fabricated from HSA-CERCANAM®. This wall 120 may be infiltrated or embedded with a catalyst material as previously discussed herein. The intrinsically high surface area of HSA-CERCANAM® improves the contact between the hydrocarbon feedstock and the catalyst, thereby improving the yield of hydrogen gas in the product stream 108 compared to other materials. This improvement in efficiency will be discussed in association with FIG. 9.

Although specific reference has been made herein to CERCANAM®, the reformer 100 is not limited these materials. Indeed, any reformer 100 which utilizes a porous or ionically-conductive membrane 106 to selectively remove hydrogen from the reaction zone 104, while the reactions therein are occurring, is intended to fall within the scope of the invention. CERCANAM® or similar materials simply provide one example of materials that may be used to fabricate a reformer 100 in accordance with the invention.

Figure 2:
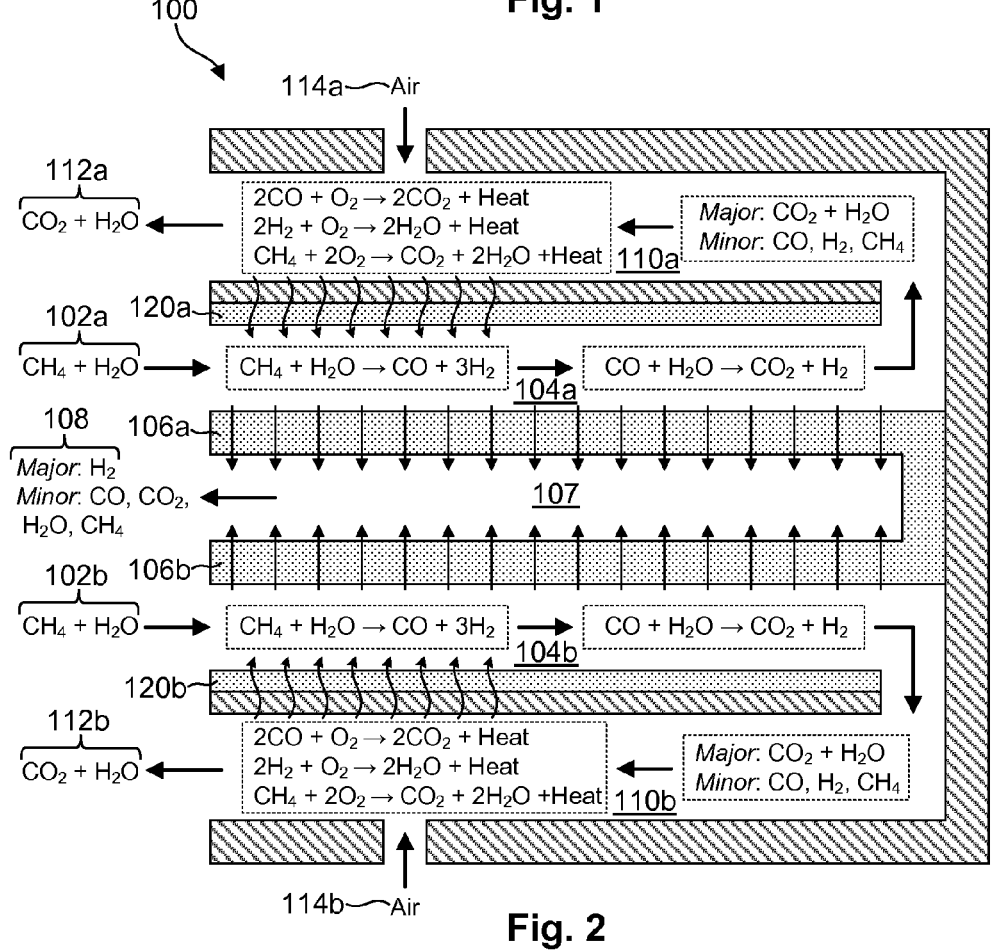
FIG. 2 is a high-level schematic diagram of another embodiment of a catalytic microchannel reformer in accordance with the invention.

Referring to FIG. 2, in other embodiments, a microchannel reformer 100 in accordance with the invention may be designed in a symmetric configuration to improve efficiency and generate additional product. For example, a microchannel reformer 100 may receive dual inputs streams 102a, 102b, each containing a hydrocarbon feedstock fuel and steam. These streams 102a, 102b may be conveyed to dual reaction zones 104a, 104b, which may exist within microchannels of the device 100. A porous ceramic membrane 106a, 106b may be placed adjacent to each reaction zone 104a, 104b. Each of these ceramic membranes 106a, 106b may communicate with a single product zone 107, which may output a product stream 108. Similarly, each of the reaction zones 104a, 104b may communicate with a different combustion zone 110a, 110b, where residual reactants and reaction products may be combusted to produce heat to drive the SMR and WGS reactions. By using dual reaction zones 104a, 104b, more catalyst-infiltrated surface area is available to increase the efficiency of the reactor 100.

Figure 3:
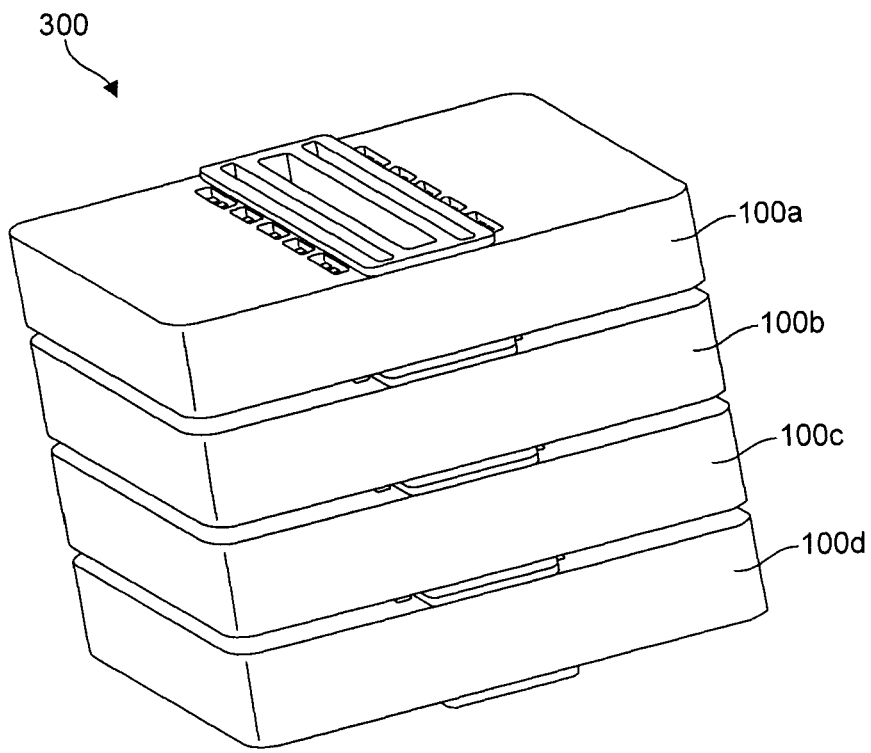
FIG. 3 is a perspective view of one embodiment of a stack of catalytic microchannel reformers in accordance with the invention.

Referring to FIG. 3, in selected embodiments, a catalytic microchannel reformer 100 in accordance with the invention may be scalable in order to produce hydrogen at a desired rate. For example, in selected embodiments, multiple microchannel reformers 100a-d, each working in accordance with the reformer 100 of FIG. 2, may be fabricated as interconnectable modules 100a-d. These modules 100a-d may be linked together to create a stack 300 having a desired hydrogen production rate. Furthermore, modules 100a-d may be added or removed from the stack 300, as needed, to increase or decrease the hydrogen production rate.

Figure 4:
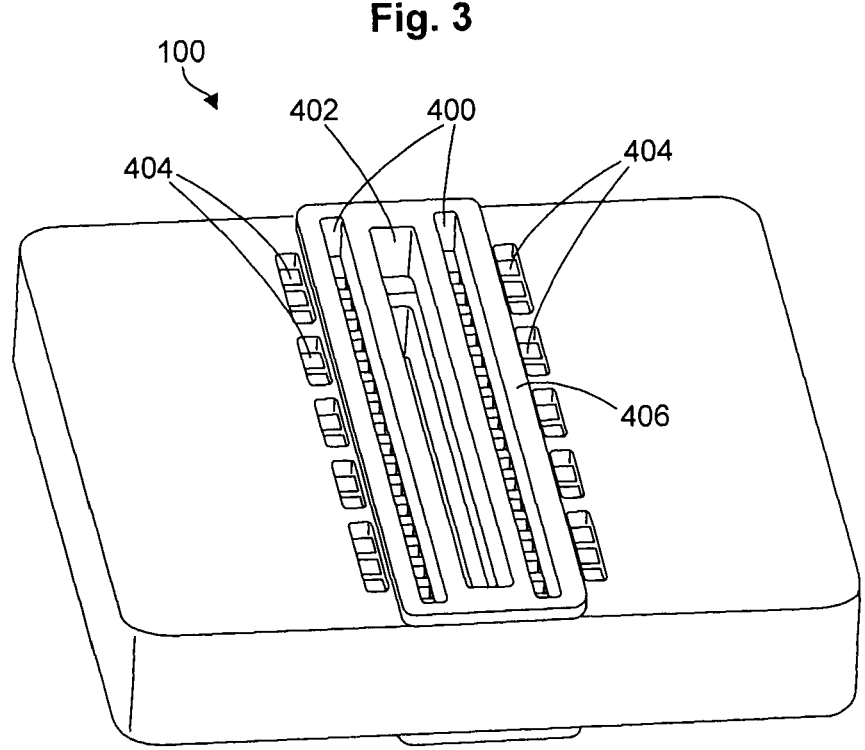
FIG. 4 is a perspective view of one embodiment of a single catalytic microchannel reformer in accordance with the invention.

Referring to FIG. 4, in selected embodiments, a microchannel reformer module 100 may include one or more input ports 400 to receive an input stream 102, namely a hydrocarbon feedstock fuel and steam. A central product port 402 may output a product stream 108 containing hydrogen gas as the primary constituent. Exhaust ports 404 may be used to expel an exhaust stream 112 as well as supply air (i.e., oxygen) to an internal combustion zone 110. As shown, in selected embodiments, the input ports 400 and product port 402 may be located on a central interface plate 406, allowing the ports 400, 402 to interface with corresponding ports 400, 402 on adjacent modules 100a-d.

Figure 5:
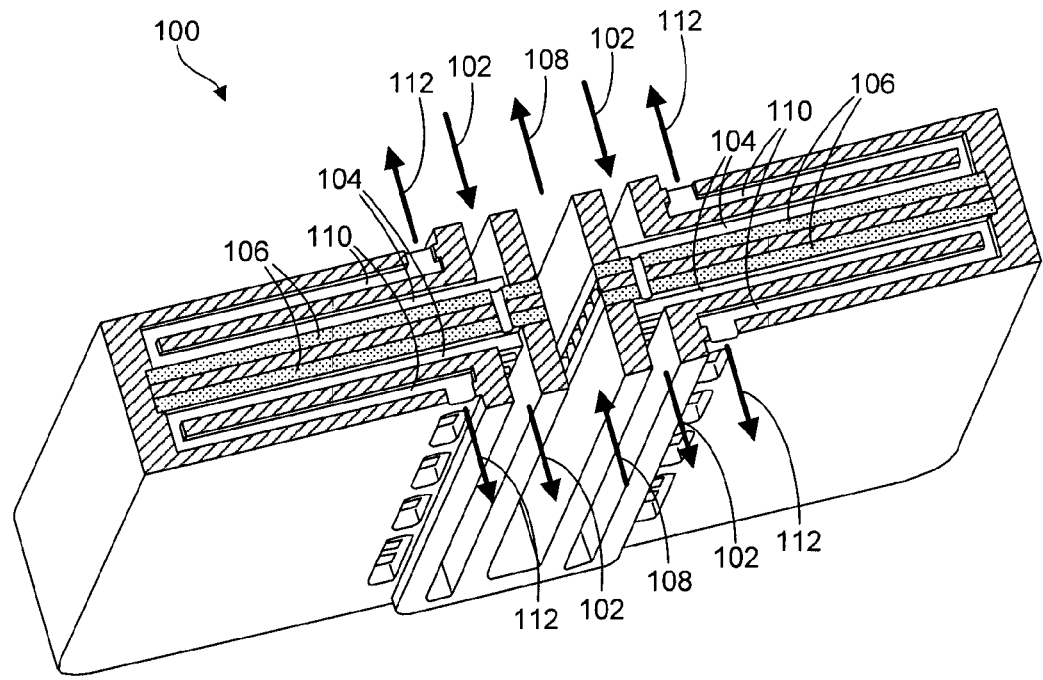
FIG. 5 is a cutaway perspective view of the catalytic microchannel reformer of FIG. 4.

Referring to FIG. 5, a cutaway perspective view of the microchannel reformer module 100 of FIG. 4 is illustrated. The module 100 includes input streams 102, a product stream 108, and exhaust streams 112 to show the flow of gases through the module 100. These streams 102, 108, 112 may be compared to the schematic diagram of FIG. 2 to more fully understand the flow and operation of the microchannel reformer 100. As shown, ports are provided on a top and bottom side of the module 100 to allow the input stream 102 to flow to other downstream modules 100 as well as receive a product stream 108 from downstream modules 100. The reactions zones 104, combustion zones 110, and porous ceramic membranes 106a, 106b are also shown within the device 100.

As explained previously, in selected embodiments, where CERCANAM® is used as the fabrication material, the module 100 may be fabricated in as few as two processing steps, while understanding that the fabrication process is not limited to any specific number of steps. That is, the entire structure 100 may be fabricated in two casts, namely, one cast for the HSA-CERCANAM® portions and one cast for the LSA-CERCANAM® portions. Channels in the structure 100 may be formed by inserting sacrificial organic inserts into the CERCANAM® slip, such as mylar or plastic inserts. When the CERCANAM® structure is fired, these organic materials may burn away to leave the desired channels in the structure 100.

Figure 6:
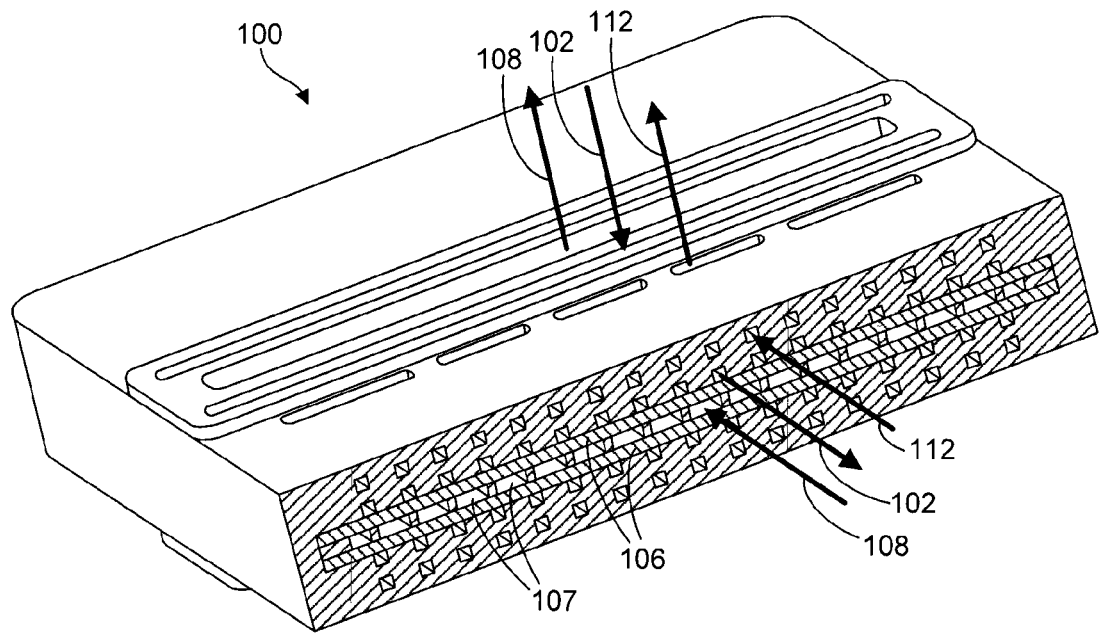
FIG. 6 is an alternative cutaway perspective view of the catalytic microchannel reformer of FIG. 4.

Referring to FIG. 6, an alternative cutaway perspective view of the microchannel reformer module 100 of FIG. 4 is illustrated. Like the cutaway view of FIG. 5, the module 100 is illustrated with the input stream 102, product stream 108, and exhaust stream 112 to show the flow of gases through the module 100. The porous ceramic membranes 106a, 106b and product zones 107 are also shown.

Figure 7:
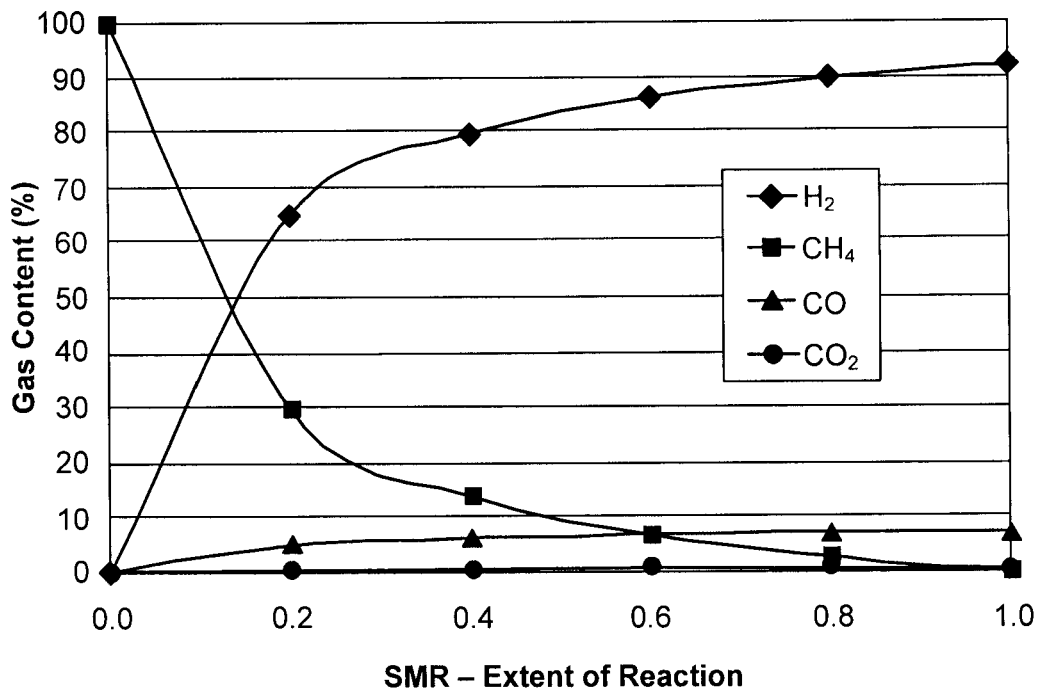
FIG. 7 is a graph showing the product gas composition in relation to the extent of reaction of a steam-methane-reforming (SMR) reaction.
Figure 8:
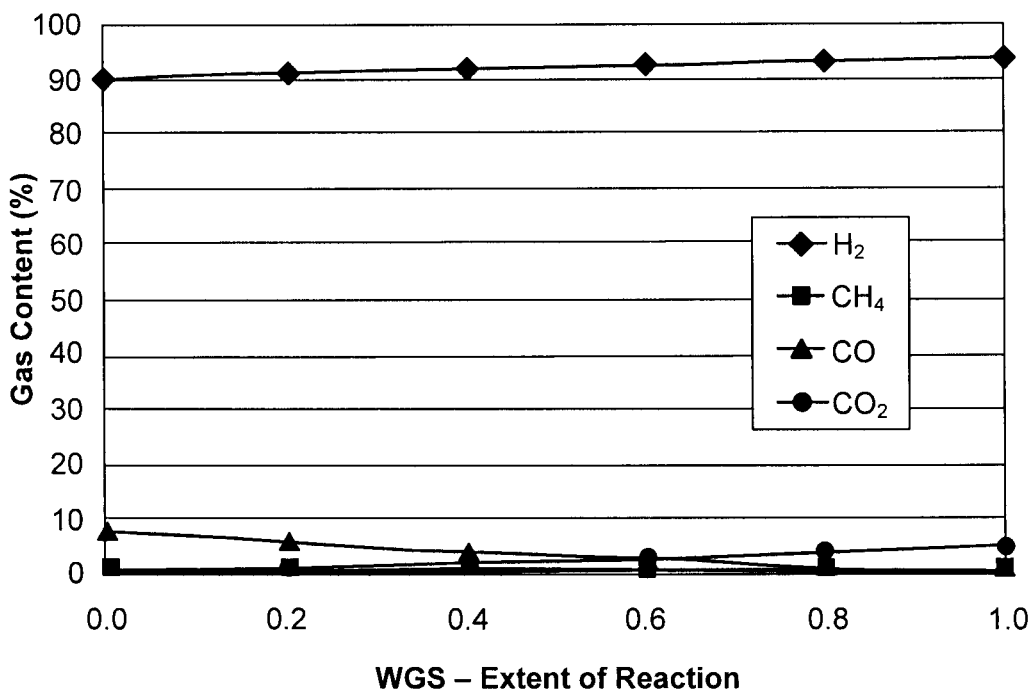
FIG. 8 is a graph showing the product gas composition in relation to the extent of reaction of a water-gas-shift (WGS) reaction.

Referring to FIGS. 7 and 8, as mentioned in relation to Table I, the combination of a higher initial concentration of $H_2$ in the reaction zone and the higher diffusivity of $H_2$ compared to other gas species will result in a product gas stream 108 with very high purity (e.g., greater than 91 percent hydrogen on a wet basis). We can carry this simplified calculation a bit further by exploring the variation of the product gas composition 108 as a function of the extent of reaction for each reaction (i.e., the SMR and WGS reactions), while keeping the extent of reaction for the other reaction constant. FIG. 7 shows the product gas composition 108 as the extent of the SMR reaction goes from zero to full completion. FIG. 8 shows the product gas composition 108 as the extent of the WGS reaction goes from zero to full completion.

As shown in FIG. 7, when the extent of the SMR reaction exceeds 0.6, the product gas composition is over 85 percent $H_2$, even where the extent of the WGS reaction is as low as 0.1. As shown in FIG. 8, where the extent of the SMR reaction is held constant, the $H_2$ concentration is only a mild function of the extent of the WGS reaction. Thus, as long as the extent of the SMR reaction is 0.9 or higher, an $H_2$ concentration of over 90 percent can be expected in the product gas stream 108.

The calculations provided in FIGS. 7 and 8 are based on a number of simplifying assumptions and thus should only be used as a guideline. For example, these calculations do not consider the thermodynamics of the SMR and WGS reactions. Furthermore, these calculations do not account for the fact that the reformer gas concentration may vary along the length of the microchannels, resulting in variations in gas concentration percolating across the channels at different locations in the reformer 100. Furthermore, the extents of reaction are not independent of each other. For example as the extent of the SMR reaction increases, more CO and $H_2$ may be generated in the reactor 100. Because $H_2$ is removed from the reaction zone 104 much faster than CO, this would create an excess of reactants for the WGS reaction, thereby driving the equilibrium composition further towards the product side of the reaction. In addition, the selective removal of $H_2$ also drives the SMR reaction further towards the product side.

Other simplifying assumptions ignore other possible reactions that may occur in the reactor 100 such as "coking reactions" as indicated by the following equations:

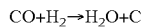

$$CO + H_2 \rightarrow H_2O + C$$

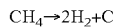

$$CH_4 \rightarrow 2H_2 + C$$

The first coking reaction is not favored in the presence of excess steam since steam is on the product side of the reaction, and excess steam favors the reverse reaction. On the other hand, too much steam in the feed gas is also non-ideal since it reduces the overall efficiency of the microreactor due to the energy required to heat the excess steam.

Figure 9:
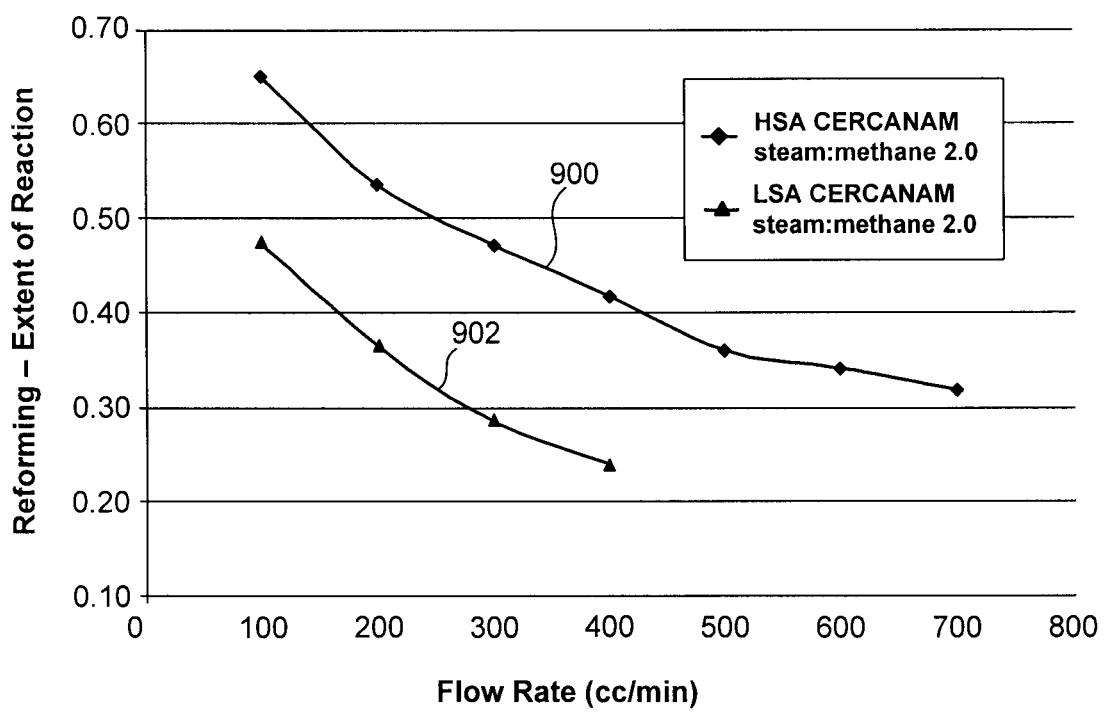
FIG. 9 is a graph showing the extent of reaction for an SMR reaction where a catalyst is embedded in a high-surface-area CERCANAM® material and a low-surface-area CERCANAM® material.

Referring to FIG. 9, the difference in methane reforming capability for catalysts embedded in different CERCANAM® materials is illustrated. The upper curve 900 represents the extent of the SMR reaction where the catalyst is infiltrated or embedded in a wall 120 made of HSA-CERCANAM®. The lower curve 902 represents the extent of the SMR reaction where the catalyst is infiltrated or embedded in a wall 120 made of LSA-CERCANAM®. The graph shows that the extent of the SMR reaction was significantly better for HSA-CERCANAM® than it was for the LSA-CERCANAM® for all measured flow rates. These results show that the higher $H_2$ yields in the product gas stream 108 are likely due to the increased intimacy of contact between the catalyst and methane in the catalyst-infiltrated HSA-CERCANAM® wall 120.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for enhancing the yield and purity of hydrogen when reforming hydrocarbons, the method comprising:
receiving a hydrocarbon feedstock fuel and steam at a reaction zone;
reacting, at the reaction zone, the hydrocarbon feedstock fuel and steam to produce hydrogen gas;
diffusing reactants and reaction products in the reaction zone through pores of a single layer ceramic porous membrane to a product zone, and selectively transporting hydrogen gas through the pores of the porous membrane from the reaction zone to the product zone while the reaction is occurring, wherein selectively transporting comprises diffusing the hydrogen gas through the pores of the porous membrane at a higher diffusion rate than diffusion rates of the reactants and other reaction products, and wherein a first surface of the single layer porous membrane is exposed to reaction zone and a second surface of the single layer porous membrane opposite the first surface is exposed to the product zone; and
conveying the reactants and the reaction products that are not transported through the porous membrane to a combustion zone.

2. The method of claim 1, wherein the reaction zone and the product zone are in fluid communication through the pores of the porous membrane.

3. The method of claim 2, wherein the porous ceramic membrane is fabricated from a mixture of alumina powder and a phosphate-containing reagent to react with the alumina powder.

4. The method of claim 1, wherein reacting the hydrocarbon feedstock fuel and steam further comprises producing carbon monoxide at the reaction zone.

5. The method of claim 4, further comprising reacting the carbon monoxide with steam to produce hydrogen gas and carbon dioxide at the reaction zone.

6. The method of claim 1, where selectively transporting hydrogen gas through the pores of the porous membrane further comprises diffusing, at a diffusion rate significantly lower than the diffusion rate of hydrogen gas, other gases through the pores of the porous membrane.

7. The method of claim 6, wherein the other gases comprise at least one of carbon monoxide, carbon dioxide, steam, and gaseous hydrocarbon.

8. The method of claim 1, further comprising providing heat to the reaction zone to aid in reacting the hydrocarbon feedstock fuel and steam.

9. The method of claim 8, further comprising combusting at least one of residual hydrocarbon feedstock fuel, hydrogen gas, and carbon monoxide in the combustion zone to provide the heat to the reaction zone.

10. The method of claim 1, wherein the hydrocarbon feedstock fuel is selected from the group consisting of methane, vaporized methanol, natural gas, vaporized diesel, and combinations and sub-components thereof.

11. The method of claim 1, further comprising creating intimate contact between the hydrocarbon feedstock fuel, the steam, and a catalyst while the reaction is occurring.

12. A device for enhancing the yield and purity of hydrogen when reforming hydrocarbons, the device comprising:
an inlet for receiving a hydrocarbon feedstock fuel and steam;

a reaction zone in communication with the inlet to react the hydrocarbon feedstock fuel and the steam to produce hydrogen gas;

a single layer porous ceramic membrane in communication with the reaction zone to diffuse reactants and reaction products through pores of the porous ceramic membrane and to selectively transport hydrogen gas through the pores of the porous ceramic membrane out of the reaction zone while the reaction is occurring, thereby increasing the extent of reaction between the hydrocarbon feedstock fuel and the steam, wherein the selective transport of hydrogen gas comprises diffusion of the hydrogen gas through the pores of the porous ceramic membrane at a higher diffusion rate than diffusion rates of the reactants and other reaction products;

a product zone to receive the hydrogen gas transported through the porous ceramic membrane, and wherein a first surface of the single layer porous membrane is exposed to reaction zone and a second surface of the single layer porous membrane opposite the first surface is exposed to the product zone; and a combustion zone to combust the reactants and the reaction products that are not transported through the porous ceramic membrane.

13. The device of claim 12, wherein the porous ceramic membrane is fabricated from a mixture of alumina powder and a phosphate-containing reagent to react with the alumina powder.

14. The device of claim 12, wherein the reaction zone is further adapted to react carbon monoxide with the steam to produce hydrogen gas and carbon dioxide.

15. The device of claim 12, wherein the porous ceramic membrane is further adapted to transport other gases out of the reaction zone at a diffusion rate significantly lower than the hydrogen gas.

16. The device of claim 15, wherein the other gases comprise at least one of carbon monoxide, carbon dioxide, steam, and gaseous hydrocarbon.

17. The device of claim 12, wherein the combustion zone combusts at least one of residual hydrocarbon feedstock fuel, hydrogen gas, and carbon monoxide to provide heat to the reaction zone.

18. The device of claim 12, wherein the hydrocarbon feedstock fuel is selected from the group consisting of methane, vaporized methanol, natural gas, vaporized diesel, and combinations and sub-components thereof.

19. The device of claim 12, further comprising a porous ceramic layer infiltrated with a catalyst adjacent to the reaction zone.

20. A method for enhancing the yield and purity of hydrogen when reforming hydrocarbons, the method comprising:

receiving a hydrocarbon feedstock fuel and steam at a reaction zone;

reacting, at the reaction zone, the hydrocarbon feedstock fuel and steam to produce hydrogen gas;

diffusing reactants and reaction products in the reaction zone through pores of a single layer porous ceramic membrane, and selectively transporting hydrogen gas from the reaction zone to a product zone by extracting one of hydrogen gas and hydrogen ions through a ceramic membrane while the reaction is occurring, wherein selectively transporting comprises diffusing the hydrogen gas through the pores of the porous membrane at a higher diffusion rate than diffusion rates of the reactants and other reaction products, and wherein a first surface of the single layer porous membrane is exposed to reaction zone and a second surface of the single layer porous membrane opposite the first surface is exposed to the product zone; and conveying the reactants and the reaction products that are not transported through the porous ceramic membrane to a combustion zone.

21. The method of claim 1, wherein the porous membrane is free of a discrete metallic layer.

* * * * *